Feb. 8, 1949.  V. BLINOFF  2,460,969
METHOD FOR PRODUCING HIGHER MOLECULAR ALCOHOLS
Filed Dec. 11, 1946
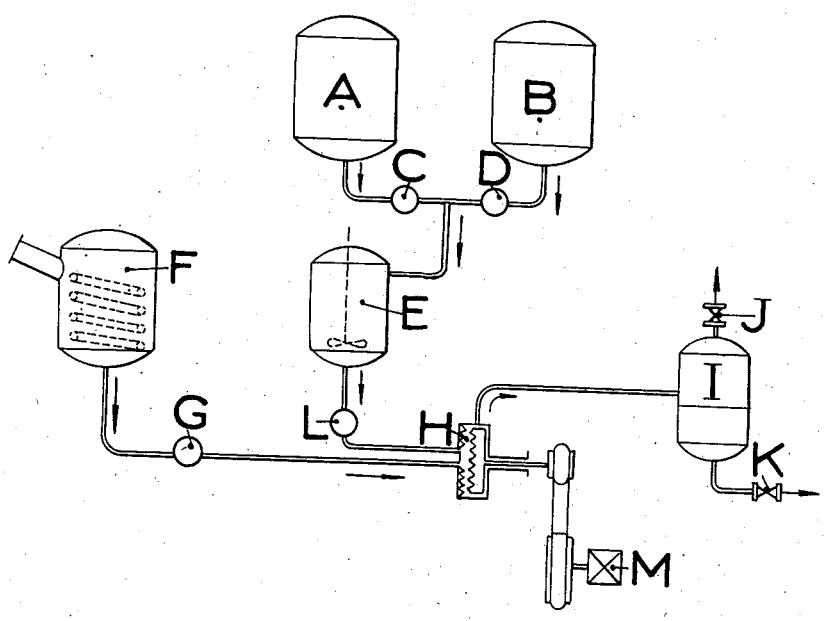
INVENTOR
Vsevolod Blinoff
By Robert E. Burns
ATTORNEY Patented Feb. 8, 1949

2,460,969

UNITED STATES PATENT OFFICE 2,460,969

METHOD FOR PRODUCING HIGHER MOLECULAR ALCOHOLS

Vsevolod Blinoff, Paris, France, assignor to Societe Anonyme d'Innovations Chimiques dite: Sinnova ou Sadic, Meaux-Beauval, France Application December 11, 1946, Serial No. 715,391
In France June 28, 1946

4 Claims. (Cl. 260—638)

The production of higher molecular alcohols by reducing an ester with sodium in an alcoholic medium is known long since (Bouveault and Blanc's reaction); however, it has never been carried out on an industrial scale by reason particularly of the too high cost of the alcohol obtained and of the danger connected with the use of sodium unless quite particular precautions are taken.

Various ways have been tried to make the said method commercially valuable, but in fact none had ever given appreciable results until the applicant worked out the one described in his application for a French patent dated July 2, 1941 entitled: "A method for the production of higher molecular alcohols." The working conditions necessary and sufficient to provide for a satisfactory yield of the reaction are described most specifically in said patent in which there is notably pointed out that the moisture content of the reaction constituents should be brought down to less than .001 and even to less than .0001%.

It has now been found, according to this invention, that the yield of the reaction can be improved materially, it becoming almost quantitative, and the reaction itself made much easier by working continuously.

For that purpose, carefully controlled amounts of the ester and the solvent, for instance amyl alcohol, butyl alcohol or some other alcohol, and contingently of hydrocarbons, are mixed and carefully controlled amounts of the said mixture and molten sodium are led into an apparatus providing for thorough mixing and in which high rates of flow are maintained; the exothermic reaction sets in, whereby the products are brought almost to boiling temperature; the reaction product is collected by removing the hydrogen therefrom; the solvent is recovered and then carefully dehydrated to be used anew in the reaction, fatty alcohols being thus obtained in substantially quantitative yield.

In addition to its remarkable efficiency this method has the advantage that it requires only a comparatively quite small amount of solvent, about one tenth of what is necessary when working discontinuously, due to the short duration of the cycle which makes it possible to recover said solvent very soon for re-use; moreover, all danger is avoided on one hand because the reaction constituents are present in very small amounts whereas up to the present the reaction would be carried out in large vessels of 1,000-litre capacity and more and on the other hand owing to the fact that it is possible to work completely removed from the air in vessels wholly filled with liquid; still a further advantage resides in the possibility of working under higher than atmospheric pressure and consequently at higher temperatures since the reaction is carried out at boiling temperature, whereby same will proceed more readily.

An apparatus for the performance of the method according to this invention is illustrated diagrammatically in the appended drawing.

A pair of supply tanks A and B contain the ester and the solvent respectively; they are connected by pipes through metering pumps C and D with a mixing tank E in which a stirrer may be provided.

The sodium is present in the liquid state in the sodium melting oven F; same is connected by a pipe through a metering pump G with a grinder H designed for high dispersing capacity with which is also connected a pipe leading from the mixing tank E; a motor M drives the grinder at the desired speed; the reacted mixture is delivered into a tank I from which the hydrogen is released through valve J; fatty alcohols dissolved in the solvent are let out through a further pipe controlled by a valve K which may be responsive to the level of the liquid in tank I.

Contingently, a metering pump L may also be provided between the mixing tank E and the grinder H.

Tanks A and B are filled up to any desired level with ester and solvent respectively, whose moisture content should be less than .001 and preferably even less than .0001%; the sodium melting oven is also filled up to any desired level; all the metering pumps, the mixing tank and the grinder are completely filled with the substances involved in order to entirely exclude air from the reaction mixture and thus to remove all danger of explosion.

The vessels and pipes being all fluid-tight, it is possible to work under pressure; a cooler need not yet may contingently be provided.

It should be understood that in lieu of the grinder any other device that will provide for intimate diffusion of the molten sodium throughout the ester as well as for a sufficient rate of flow may be used.

*Example 1.*—Cocoanut oil is carefully dried as well as the solvent which is constituted by a low-molecular alcohol (e. g. butyl or amyl alcohol) continuously admixed with a small amount of hydrocarbons. The solvent and the oil are mixed together in the proportion of 20 parts by weight of oil to 100 parts by weight of solvent. The mixture is introduced continuously and uniformly into a grinder together with molten sodium (9 parts by weight of sodium to 120 parts by weight of the oil-solvent mixture). The temperature of the mixture introduced into the grinder is held at about 100° C.; the temperature at the outlet of the grinder reaches 150° C.

Following the hydrolysis of the alcoholates formed by the reaction of the sodium with the alcohol and the solvent the subsequent operations are such as described in the aforementioned French patent.

*Example 2.*—A mixture of 30 parts by weight of sperm oil with 100 parts by weight of solvent, to be reduced with 8.5 parts by weight of sodium is started from, the procedure being the same.

*Example 3.*—A mixture of 15 parts by weight of butyl stearate with 100 parts by weight of solvent, to be reduced with 4.5 parts by weight of sodium is started from.

*Example 4.*—The same raw materials are used in the same proportions as described in Example 1; however, the temperature of the substances at the inlet of the grinder is increased in such manner that temperatures of 180 to 200° C. are obtained at the outlet; in these conditions the reaction proceeds under a pressure of 4 to 5 kg. per sq. cm.

What I claim as my invention and desire to secure by Letters Patent is:

1. In a continuous method for the production of a high molecular alcohol by the reaction of a water-free alcoholic solution of an ester with metallic sodium continuously conducting separate closed streams of the ester solution and of the molten sodium into a small reaction vessel completely filled by the reactants, grinding the said two components in said vessel into a dispersion at a temperature from about 100° to 200° C. while maintaining a continuous high rate of flow of the reactants through said vessel and removing the reaction products continuously from the same.

2. In a continuous method for the production of a high molecular alcohol by the reaction of a water-free alcoholic solution of an ester with metallic sodium continuously conducting separate closed streams of the ester solution and of the molten sodium into a small reaction vessel completely filled by the reactants while avoiding an excess of sodium over the theoretical conversion rate, grinding the said two components in said vessel into a dispersion at a temperature from about 100° to 200° C. while maintaining a continuous high rate of flow of the reactants through said vessel and removing the reaction products continuously from the same.

3. In a continuous method for the production of a high molecular alcohol by the reaction of a water-free alcoholic solution of an ester with metallic sodium mixing the water-free ester and the water-free alcoholic solvent at a rate of about 15 to 30 parts of the ester to about 100 parts of the solvent, continuously conducting separate closed streams of the ester solution and of the molten sodium into a small reaction vessel completely filled by the reactants, grinding the said two components in said vessel into a dispersion at a temperature from about 100° to 200° C. while maintaining a continuous high rate of flow of the reactants through said vessel and removing the reaction products continuously from the same.

4. In a continuous method for the production of a high molecular alcohol by the reaction of a water-free alcoholic solution of an ester with metallic sodium continuously conducting separate closed streams of the ester solution and of the molten sodium into a small reaction vessel completely filled by the reactants while maintaining in the said vessel a substantially molecular ratio of the reacting substances within 15 to 30 parts by weight of the ester and 4.5 to 8.5 parts by weight of the sodium, grinding the said two components in said vessel into a dispersion at a temperature from about 100° to 200° C. while maintaining a continuous high rate of flow of the reactants through said vessel and removing the reaction products continuously from the same.

VSEVOLOD BLINOFF.

REFERENCES CITED

The following references are of record in the file of this patent:

UNITED STATES PATENTS

| Number | Name | Date |
|---|---|---|
| 1,971,742 | Bertsch | Aug. 28, 1934 |
| 1,971,743 | Bertsch | Aug. 28, 1934 |
| 2,019,022 | Scott | Oct. 29, 1935 |
| 2,070,318 | Rosser et al. | Feb. 9, 1937 |

FOREIGN PATENTS

| Number | Country | Date |
|---|---|---|
| 417,383 | Great Britain | Sept. 27, 1934 |